Feb. 28, 1967 T. G. BIXBY 3,306,685
ANGULAR CONTACT BALL BEARING ASSEMBLY
Original Filed July 29, 1963

Inventor.
Thomas G. Bixby
By Mueller & Aichele
Attys

United States Patent Office 3,306,685
Patented Feb. 28, 1967

3,306,685
ANGULAR CONTACT BALL BEARING
ASSEMBLY
Thomas G. Bixby, Valparaiso, Ind., assignor to McGill Manufacturing Company, Inc., Valparaiso, Ind., a corporation of Indiana
Continuation of application Ser. No. 298,156, July 29, 1963. This application July 19, 1965, Ser. No. 477,343
1 Claim. (Cl. 308—201)

This application is a continuation of application Serial No. 298,156, filed July 29, 1963.

This invention relates generally to ball bearing assemblies and in particular to an angular contact ball bearing assembly having improved retaining means for spacing and guiding the balls.

Angular contact ball bearing assemblies of the type employing a relatively deep grooved inner race and a single shoulder outer race may be advantageously used in many heavy duty bearing applications. Since one axial end of the outer race does not have a radially extending shoulder, approximately 20–30 percent more balls may be assembled with one-piece races without using special loading notches or other special assembly means, resulting in a heavier loading capacity than in corresponding annular contact ball bearing assemblies. In addition, it is possible to provide contact between the balls and the races over a substantial arc so that the bearing assembly can sustain severe thrusts which may be produced under the combined axial and radial loading conditions.

Even with the increased number of balls possible with angular contact assemblies, less than a full complement of balls is desirable in that full complement assemblies are limited in operating speeds and may be subjected to distortion and marking of the balls under severe loading conditions. Accordingly, it is necessary to provide a retainer to properly space and guide the balls. Although two-piece retainers have been proposed wherein suitable segments are inserted after assembly of the races and the balls and subsequently riveted, staked or otherwise fastened together, such retainers are expensive to assemble and do not stand up under severe loading conditions. One piece retainers are preferable in that the assembly is simplified by positioning the balls and the retainer over the inner race and subsequently snapping on the outer race, and in that they are more suitable for heavy duty applications.

However, known one-piece retainers for angular contact ball bearing assemblies still remain a substantial cost item of the overall assembly. Typically they consist of solid rings such as brass or a phenolic material having drilled radial pockets to receive the balls. It is desirable on one hand to limit the depth of the groove in the inner race to approximately 20–25 percent of the ball diameter to minimize machining costs, and on the other hand to provide a retainer which is land riding on the inner race while guiding the balls at approximately their pitch circle. It is readily apparent that for these two criteria to be met, one-piece retainers of the type described are rather heavy and expensive machined parts, having a substantial radial thickness. A retainer of less radial thickness is obtained at the cost of machining a deeper ball groove in the inner race.

It is therefore among the objects of the present invention to provide an angular contact ball bearing assembly with an improved one-piece retainer for the balls.

Another object is to provide an angular contact ball bearing assembly incorporating an improved retainer which enables the assembly to be economically fabricated with a maximum number of balls.

A further object is to provide a simple and economical ball retainer particularly adapted for use with a grooved inner race, single shouldered outer race, angular contact type ball bearing assembly.

A feature of the present invention is the provision of a simple, easily fabricated one-piece ball retainer which is land riding on the shoulders of a relatively shallow grooved inner race while at the same time providing pitch circle guidance of the balls of an angular contact type ball bearing assembly.

Another feature is the provision, in an angular contact ball bearing assembly, of a thin-walled retainer which has a raised center portion with contoured ball pockets which allow the retainer to guide the balls at their pitch circle. The raised center portion enables the retainer to be land riding so that a 20–25 percent (of the ball diameter) inner race shoulder height may be employed.

A further feature is the provision, in an angular contact ball bearing assembly of the type described, of a thin-walled one-piece ball retainer which is easily fabricated by stamping contoured pockets in a flat steel strip, which strip is subsequently formed, rolled, welded and hardened to provide a simple, economical, wear resistant structure for improved bearing performance.

Other objects, features and attending advantages of the invention will become apparent from the following description when taken in conjunction with the accompanying drawings, in which.

In practicing the invention there is provided an angular contact ball bearing assembly of the type having a grooved inner race and a single shouldered outer race with one axial end of the outer race being enlarged in diameter to permit snapping over a maximum quantity of balls without resorting to special loading notches or other assembly means. A thin-walled retainer is provided for spacing and guidance of the balls, which retainer has circular rim portions on its axial ends that are maintained in land riding relationship on the shoulders of the inner race. Cross bars joining the annular rims are raised and contoured to provide ball retaining pockets which guide the balls at their pitch circles. The retainer is of thin cross-section and may be economically fabricated from sheet metal stock such as strip steel by simple punching, forming, rolling, and welding operations. This eliminates the necessity of providing an expensive machined retainer, and provides a resulting structure which is light weight and highly wear resistant.

Figure 1:
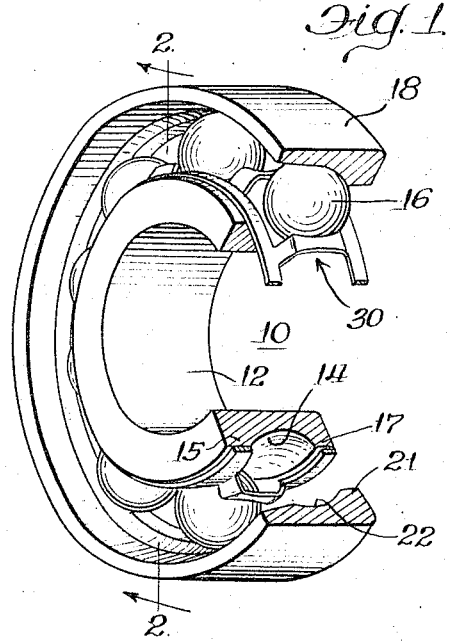
FIG. 1 is a perspective view, with a cut away portion, of an angular contact ball bearing assembly in accordance with the invention.
Figure 2:
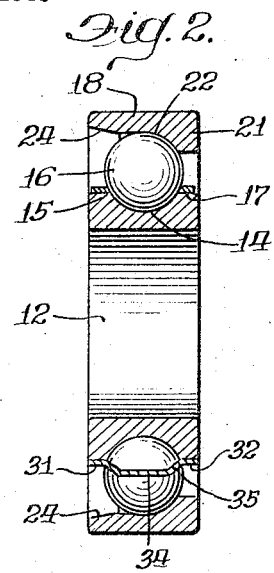
FIG. 2 is a cross-sectional view of an assembled bearing in accordance with the invention.

Referring now to FIGS. 1 and 2, ball bearing assembly 10 includes an inner race ring 12 having an annular groove 14 therein, which groove is further defined by shoulders or flanges 15 and 17 on each axial end of inner race ring 12. Groove 14 is circular in cross-section and preferably has a depth which is approximately 20–25 percent of the ball diameter. Outer race ring 18 is snapped over balls 16 in a completed bearing assembly. Outer race ring 18 has a shoulder 21 on one axial end thereof to define an angular contact area 22, which corresponds to an arc somewhat less than that subtended by groove 14 in the inner race ring 12. The other axial end of outer race ring 18 has a cutaway portion 24 of increased diameter. This enables outer race ring 18 to be readily snapped over a complement of balls 16 disposed around the inner race ring. Since less than a full complement of balls are employed, retainer 30 is maintained between the inner and outer races for retention and guidance from the balls.

Retainer 30 (see also FIGS. 3 and 4) has circular rim portions 31 and 32 at its axial ends or sides, which rim portions are connected by axially extending cross bars. These cross bars include a raised and contoured center section 34 and tapered, angularly extending intermediate connecting sections 35. The inner peripheral surface of rim portions 31 and 32 are dimensioned to provide a loose fit with shoulders 15 and 17 of inner race 12 to be land riding therewith. Center section 34 is raised radially outwardly with respect to rim portions 31 and 32 and the inner edges 37 of center section 34 are contoured in an arcuate manner to conform with the circular cross-section of balls 16 taken at their pitch diameter. Intermediate sections 35 are slightly tapered so that the cross bars may be stamped in a flat strip of sheet steel which is subsequently punched to form center sections 34 then rolled and welded to provide a complete retainer. Intermediate sections 35 extend between annular rim portions 31 and 32 and contoured center section 34 at approximately a 45° angle.

Figure 3:
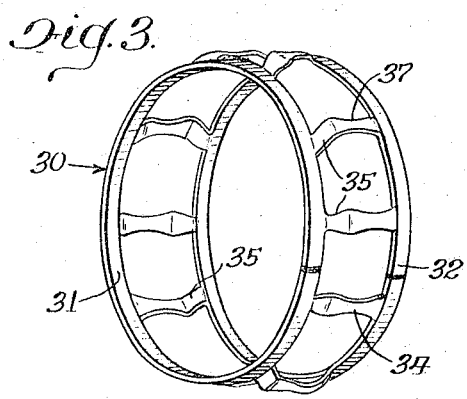
FIG. 3 is a perspective view of the retainer as used in FIGS. 1 and 2.
Figures 5, 6:
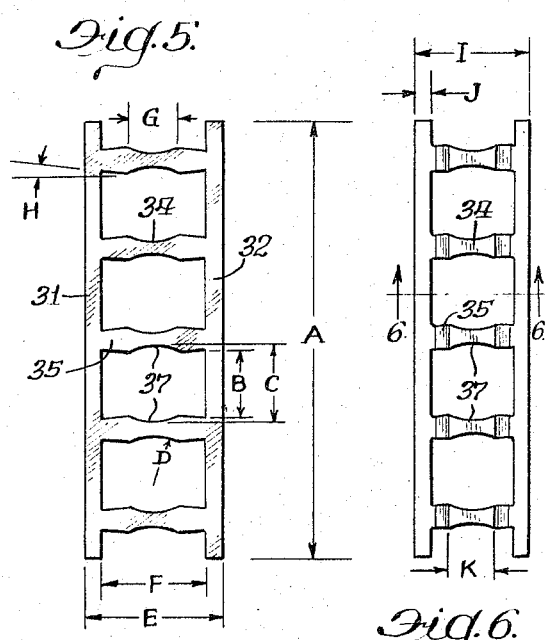
FIGS. 5–7 illustrate various steps in fabricating the retainer of FIG. 3 from flat steel strip.
Figure 4:
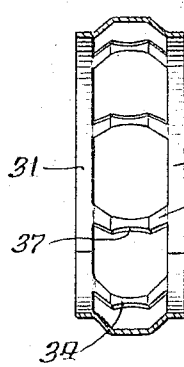
FIG. 4 shows the retainer of FIG. 3 in cross-section.
Figure 7:
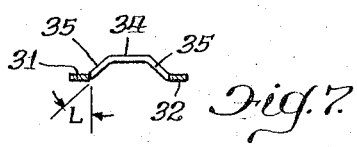

Retainer 30 is fabricated from the cold rolled steel strip as best can be seen in FIGS. 5-7. By way of example, a .042 inch thick steel strip has a plurality of pockets punched therein as shown in FIG. 7. It is to be noted from FIG. 5 that in addition to contoured edges 37 of center section 34, the intermediate sections 35 of the cross bars joining rim portions 31 and 32 are provided with a slight taper. By way of example, to provide guidance for 10 equally spaced balls nine full pockets and two half pockets are punched in the flat strip. Subsequent to punching center sections 34 are depressed in by forming die as shown in FIGS. 6 and 7. This offsets center sections 34 a sufficient amount with respect to rim portions 31 and 32 to enable the balls in the retainer to be guided at their pitch circle while the retainer is maintained in land riding relationship on the inner race of the assembled bearing. The punched and formed strip of FIG. 6 is then formed into a cylindrical shape and welded. The welded cylinder may then be heat treated by low temperature nitriting or a similar process to a 40-50 $R_b$ hardness. This results in the finally assembled retainer as shown in FIG. 3.

In a final retainer having ten equally spaced pockets for $19/32$ inch diameter balls which are maintained on a pitch diameter of 2.2638 inches the following dimensions, in inches, (as identified on FIGS. 5-7) may be used:

| | |
|---|---|
| A | 6.426 |
| B | .507 |
| C | .563 |
| D | .306R |
| E | .834 |
| F | .627 |
| G | .332 |
| H | 8°4' |
| I | .782 |
| J | .106 |
| K | .348 |
| L | 45° |

The above dimensions, not to be taken as limiting, are typical of those which may be used in fabricating a thin-walled retainer for an angular contact ball bearing assembly in accordance with the invention.

In common with the language of the bearing art, the retainer has been used a bit loosely in the preceding specification. There is a retaining function for the unit of FIGS. 3 and 4, in the sense that the balls are retained separated from one another in the raceway. However, the unit has a guiding and separating function as can be understood from the above, and it might also be called very accurately, a separator.

The invention provides, therefore, an improved angular contact ball bearing assembly which has a one-piece thin-walled retainer of simple and economical construction to provide guidance at the pitch circle of the balls, which retainer is maintained in land riding relationship on a relatively low shoulder height of the inner race of the bearing assembly. The one-piece rolled and welded retainer provides maximum performance capabilities, and no prongs or tangs are utilized for retaining and guiding the rollers. The resulting bearing assembly is reliable in operation under heavy loading conditions, and results in substantial cost savings.

I claim:

In an angular contact ball bearing device having an inner race ring and an outer race ring with a raceway for ball bearings in each race ring, and a plurality of ball bearings in the raceway formed in said two race rings, means positioned between the race rings and over the ball bearings to separate the same in the raceway and guide said ball bearings during operation, said means comprising a one-piece sheet metal separator for said ball bearings having a thin cross-section of the same thickness throughout, said separator having first and second annular rim portions of said thin cross-section which are in slidable engagement with the oppositely axially disposed annular portions of one of said race rings during an operation of the ball bearing device and a plurality of circumferentially spaced raised cross-pieces integral with and extending between said rim portions, said cross-pieces each having an axially extending central portion and two tapered radially-extending intermediate portions with each one extending at an acute angle from its corresponding rim and joining the central portion to form an arch between said rim portions, said central portions each having an edge on each circumferential face thereof which is shaped to correspond to the surface of an adjacent ball bearing, and with each two circumferentially adjacent cross-pieces at their respective central portions being of such a length and in such a circumferential plane as to position a ball bearing therebetween as in a pocket, with a circumferential face-edge of each engaging the ball bearing and providing guidance therefor at the pitch diameter thereof, and with the configuration and dimensions of said cross-pieces and said flat rimmed portions which cooperate to form the pockets limiting contact between a ball bearing and said separator to said central portion of said separator.

References Cited by the Examiner

UNITED STATES PATENTS 2,911,268  11/1959  Staunt _____ 308—201

FOREIGN PATENTS 373,361  4/1907  France.
676,922  12/1929  France.

MARTIN P. SCHWADRON, *Primary Examiner.*

FRANK SUSKO, *Examiner.*